US009852307B2

(12) United States Patent
Tarrago et al.

(10) Patent No.: US 9,852,307 B2
(45) Date of Patent: Dec. 26, 2017

(54) METHOD OF ACCESS TO A LOCAL SERVICE OF A DEVICE COMMUNICATING VIA A TERMINAL

(71) Applicant: ELECTRICITE DE FRANCE, Paris (FR)

(72) Inventors: Arnaud Tarrago, Paris (FR); Edouard Siekierski, Paris (FR); Pierre Nguyen, Montrouge (FR); Pascal Sitbon, Chatillon (FR)

(73) Assignee: Electricite de France, Paris (FR)

( * ) Notice: Subject to any disclaimer, the term of this patent is extended or adjusted under 35 U.S.C. 154(b) by 0 days.

(21) Appl. No.: 14/396,461

(22) PCT Filed: Apr. 19, 2013

(86) PCT No.: PCT/FR2013/050874
§ 371 (c)(1),
(2) Date: Oct. 23, 2014

(87) PCT Pub. No.: WO2013/160595
PCT Pub. Date: Oct. 31, 2013

(65) Prior Publication Data
US 2015/0135334 A1    May 14, 2015

(30) Foreign Application Priority Data

Apr. 23, 2012  (FR) ..................... 12 53703

(51) Int. Cl.
G06F 21/00   (2013.01)
G06F 21/62   (2013.01)
(Continued)

(52) U.S. Cl.
CPC ....... *G06F 21/6245* (2013.01); *G06Q 20/346* (2013.01); *G06Q 20/3552* (2013.01);
(Continued)

(58) Field of Classification Search
CPC .......... G06F 21/06; G06F 21/07; G06F 11/20; G06F 17/30; H04L 67/109; H04L 63/04; H04L 63/10
(Continued)

(56) References Cited

U.S. PATENT DOCUMENTS 6,726,100 B2    4/2004  Lauper et al.
8,351,350 B2 *  1/2013  Bhandari ............ G06F 13/4068
                                                      370/254
(Continued)

FOREIGN PATENT DOCUMENTS

EP    0 643 373 A2    3/1995
EP    0 798 671 A2   10/1997
(Continued)

*Primary Examiner* — Madhuri Herzog
(74) *Attorney, Agent, or Firm* — Drinker Biddle & Reath LLP

(57) ABSTRACT

A method of access to a local service of a device communicating via a terminal, the method comprising steps of: access to the service via an access terminal by a communicating device; reading by the access terminal of data of the communicating device, the data being personal data relating to the communicating device and/or third-party service data; writing by the access terminal of the data of the communicating device, the third-party data written being chosen from among a set of third-party service data, the choice of the third-party data to be written by the access terminal being dependent on the choosing criteria.

16 Claims, 6 Drawing Sheets

(51) Int. Cl.
*G06Q 20/34* (2012.01)
*G06Q 20/40* (2012.01)

(52) U.S. Cl.
CPC .. *G06Q 20/4033* (2013.01); *G06F 2221/2115* (2013.01); *G06F 2221/2141* (2013.01); *G06F 2221/2145* (2013.01)

(58) Field of Classification Search
USPC ............. 726/26–30; 713/150–151, 164–167, 713/189–194; 707/609–639, 655–660
See application file for complete search history.

(56) References Cited

U.S. PATENT DOCUMENTS

| | | | |
|---|---|---|---|
| 2010/0077474 A1* | 3/2010 | Yacoub | G07C 9/00103 726/20 |
| 2011/0038278 A1* | 2/2011 | Bhandari | G06F 13/4068 370/254 |
| 2011/0153791 A1* | 6/2011 | Jones | G06F 9/44505 709/221 |
| 2011/0167488 A1* | 7/2011 | Roy | G06F 21/74 726/9 |
| 2012/0133482 A1* | 5/2012 | Bhandari | G07C 9/00103 340/5.2 |

FOREIGN PATENT DOCUMENTS

| | | |
|---|---|---|
| FR | 2 820 525 A1 | 8/2002 |
| WO | WO 97/36265 A1 | 10/1997 |

\* cited by examiner

_US 9,852,307 B2_

METHOD OF ACCESS TO A LOCAL SERVICE OF A DEVICE COMMUNICATING VIA A TERMINAL

CROSS-REFERENCE TO RELATED APPLICATIONS

This application is the U.S. national phase of the International Patent Application No. PCT/FR2013/050874 filed Apr. 19, 2013, which claims the benefit of French Application No. 12 53703 filed Apr. 23, 2012, the entire content of which is incorporated herein by reference.

FIELD

The present invention relates to access to a local service delivered from an access terminal, said access terminal distributing data associated with the service to the communicating devices accessing it.

BACKGROUND

In the state of the art, many services in the fields of transportation, banking, commerce, telecommunications, or other fields, can be deployed and implemented so they are accessible via access terminals. These access terminals allow access to the service after authenticating a user equipped with a means of access. Typically, with the development of embedded technologies, such a means of access can be a smart card designed for exchanging information with the access terminal.

For example, in the field of banking, an automated cash dispensing service allows a user, via access terminals such as ATMs, to withdraw money using a means of access such as his bank card (conventionally containing a microchip).

Conventionally, the access terminals are connected to at least one central system which manages and supervises the service delivered by the terminals. This connection can be made via a wired connection, a cellular telecommunications network, or some other means, and is established in order to exchange information concerning the service between the server and the access terminals. The central system can thus, for example, retrieve information contained in the means of access, authorize a user to access the service based on the information in the means of access, or order the access terminals to update information associated with a user.

However, this connection between an access terminal and a central server can be complex or even technically unfeasible under certain installation conditions (for example, no coverage by a cellular telecommunications network or a location which does not allow setting up a wired connection). In addition, such connections require installing an expensive infrastructure, limiting the number of access terminals deployed for a service (fewer opportunities for accessing the service).

Document U.S. Pat. No. 6,726,100 discloses a system comprising a plurality of terminals for accessing a service, some of them not connected to said central system. This document describes that the information related to the service can be stored directly on the means of access. Firstly, the stored information is information retrieved by the means of access from the access terminal connected to the central system, which groups information related to the service. In this manner, the unconnected access terminals distribute the service information through data stored in the means of access. Secondly, the means of access can retrieve information contained in a database of an unconnected access terminal, in order to pass on the information for updating in the central system. Thus, the service is correctly provided by the terminals on the basis of data exchanged via the means of access, without necessarily having all the access terminals connected to the central system.

However, the aforementioned means of access generally have a low storage capacity which does not allow retrieving large amounts of information concerning the service. Consequently, for a service that includes for example a large number of users and/or a lot of information for each user, the information provided by the access terminal may be lost or overwritten on a means of access having insufficient storage. Such events are then likely to cause malfunctions in the service, related to incomplete, incorrect, or improperly distributed information.

In addition, the service information contained by the means of access could be accessed and decrypted by a malicious user, thus compromising the security and integrity of the system.

SUMMARY

The present invention improves the situation.

For this purpose, the invention proposes a method of accessing a local service, comprising the steps of:
  a communicating device accesses the service via an access terminal;
  the access terminal reads data from the communicating device, the data being personal data relating to the communicating device and/or third-party service data;
  the access terminal writes data of the communicating device, the third-party data written being selected from among a set of third-party service data, the choice of third-party data to be written by the access terminal being based on selection criteria.

In this manner, the reading of data on the communicating device (which constitutes the aforementioned means of access) allows the access terminal to retrieve data relating to the local service and/or other services, as will be further described below. By means of the data contained in the communicating devices and retrieved when the terminals read them, the service data are propagated between access terminals via an asynchronous distribution carried out by the accessing communicating devices. This distribution of service data then replaces the usually required connection with a central system. It will therefore be understood that an access terminal with no connection to the central system can adequately provide said local service on the basis of the data read from the communicating devices.

Moreover, the writing of third-party data initiated by the terminal on the communicating devices allows the communication of data to be distributed to other entities associated with the service, for example such as:
  other access terminals, or
  a central management system of the service (typically an information system), which is accessible from a terminal said to be "connected" (having a wired connection to the central system for example).

Alternatively and as described below, the communicating device, the access terminals, and the central system are able to communicate with each other via means of distance communication. In this alternative, a physical link between the central system and the access terminals is no longer required.

Of course, it is understood that access terminals said to be "unconnected" are terminals having no direct link with the aforementioned central system. Unconnected access terminals are terminals receiving/distributing service data simply by means of reading/writing data on the accessing communicating devices. Thus, data written by unconnected access terminals can be indirectly "passed on" to the central system via the communicating devices. In effect, when an unconnected terminal writes data to a device, the device can pass them on to other terminals which it subsequently accesses. In this manner, data are distributed to the other terminals (connected or unconnected), and can reach the central system when read by a connected terminal.

The method used thus allows the distribution of service data comparably to a synchronous distribution, by means of asynchronous communication means such as the communicating devices. The data of the local service are distributed by the access terminals to the communicating devices, disseminating the service data without necessarily deploying a communication infrastructure for each terminal.

The access terminal can therefore be installed without needing to establish a connection to the central system of the service. Typically, the access terminal can then be arranged:
- in a parking garage to provide electricity for recharging vehicle batteries;
- at a residential electricity meter in order to offer additional services;
- inside shops, for example to deliver electricity to power plugs to allow recharging an electronic device or powering a computer;
- or some other location.

In addition, the third-party data are distributed by being written by the access terminals (connected or unconnected) onto the communicating devices according to selection criteria. The selection criteria in this case allow the appropriate selection of the data to be written from among a set of service data. In this manner, the written data is likely to be useful, beneficial, or even essential for dissemination to other entities of the service such as other access terminals and/or the central system. In this case, selecting the data to be written allows choosing the essential or urgent data while taking into account the limited memory capacity of the communicating devices.

By way of illustration only and as will be further explained below, the selection criteria can be determined in relation to a terminal visitation rate of a communicating device, a data distribution priority level, a type of accessing communicating device (administrator or user), or some other criteria.

In addition, the selection criteria are advantageously designed to allocate and distribute the data to be distributed into a plurality of pieces of data, a set of pieces of data constituting an instruction or an information item for example. Each of the pieces can be distributed to one or more communicating devices. It is then understood that the service data contained on a communicating device do not allow the complete reconstruction of the related instruction or information item, the pieces of data needed for this reconstruction being distributed among multiple devices. A malicious user can therefore only recover part of the instruction or information item. In addition, from the user perspective, the data are distributed in a pseudo-random distribution (governed by the selection criteria determined by the terminals) between the communicating devices, making it very complex to attempt to retrieve the set of pieces of data by malicious means.

The selection criteria may also be designed to ensure redundancy in the data spread over the communicating devices. To this end, the data or even the same piece of data may be written by a terminal to multiple communicating devices. In essence, when a communicating device is lost or destroyed for example, at least one other device can contain the personal data and/or third-party data service of lost/destroyed communicating device. The local service therefore continues to be provided correctly, on the basis of data distributed to other devices. In addition, it is possible to recover the data that were originally contained in the lost/destroyed device in order to produce a new copy.

In fact, distributing the data according to selection criteria increases the robustness of the security of the distributed information and the reliability of the data distribution via the communicating devices.

Advantageously, these selection criteria are defined by the access terminal in relation to the data read from the communicating device. For illustrative purposes only, the selection criteria relate to:
- the type of accessing card, user or administrator (information specified in the personal data of a communicating device for example);
- history of past use of the service (information specified in the personal data that can be compared to similar user histories specified in the third-party data on the same communicating device);
- available memory of the communicating device;
- services subscribed to by the service user;
- or some other criteria.

Additionally or alternatively, these selection criteria are defined by the access terminal in relation to data read from communicating devices that previously accessed said access terminal. For example, the selection criteria thus relate to:
- the criticality of an information item to be distributed, considering the data read by the terminal;
- the redundancy of a piece of data to be utilized;
- a communication of new services subscribed to by users;
- or other.

In a preferred embodiment, the selection criteria adapt the amount of data to be written by the terminal, based on the available memory (specified in the personal data, for example) of an accessing communicating device. This prevents overwriting or losing data when there is insufficient memory. In addition, the selection criteria determine, based on the remaining memory, the data determined to have priority or be critical, in order to pass these data on to the central system as soon as possible.

In another example, the access terminal writes third-party data according to service usage patterns by the user of the accessing device (access terminals usually used, service provided by the service most used, etc.). As an illustration, the data written are update data intended for a terminal that the user visits regularly.

Advantageously, the third-party data of the communicating device include personal data of at least one other device.

The term "personal data" is understood to mean any type of data associated with information concerning the communicating device itself and/or concerning the user of the device in question. For purely illustrative purposes, the personal data of the communicating device may be:
- current credit in a prepaid user account;
- history of usage and/or consumption of the service;
- user profile, behavior, or characteristic;
- identity and contact information of the user of the device;
- references for the electricity meter tied to the user;
- list of subscribed or accessible services;
- audit trail for invoicing;
- type of device (administrator device for example);
- total and/or remaining memory of the device;
- or some other personal data.

"Third-party data" is understood to mean data not belonging to the user of the communicating device and not directly concerning the user. These data are therefore preferably inaccessible (due to a solution that restricts access by authentication for example) or secured by a cryptographic technique (data encryption or impossible to reconstruct information without possessing n among m information items). In this case, the third-party service data may be:

- lists of communicating devices allowed ("whitelists") or not allowed ("blacklists") to access the local service;
- histories of past use of terminals by the communicating devices;
- data for related services or services other than the local service;
- incidents passed on from an access terminal;
- or some other data.

When the third-party service data are data concerning other services, it is understood that the communicating devices also act to support the distribution of data to other access terminals, to the central system, and/or to other systems relating to the other services in question, and do so according to the method implemented by the invention.

Additionally or alternatively, said third-party data of the communicating device comprise transfer data intended for the access terminal Transfer data is understood to mean data concerning updates, configuration, an access terminal service message, or instructions to one or more terminals.

In addition, such personal data of the communicating device may comprise information relating to a user account of the local service. The personal data are then, for example, information concerning available usage credit for the user, a number of tokens for accessing the service terminals, a period of authorized use, or a remaining prepaid amount.

For illustrative purposes only, for a service that delivers electricity from access terminals such as charging stations, a user N sets a recharging time T from an unconnected terminal. If the user N does not use up all of his recharging time T, his time credit can be updated in his user account via user N+1 who subsequently accesses the same terminal User N+1 retrieves the personal information of user N (and thus the information about the unused time) when the terminal writes the personal data of user N in the third-party data for user N+1. Then, when user N+1 accesses a connected access terminal, the third-party data read by the terminal provide information on the time not used by user N so that these data are sent on to the central system and updating accordingly in the account of user N.

Advantageously, said data written by the access terminal are encrypted, and the data read from the communicating device are decrypted by the access terminal according to a cryptographic technique appropriate for the communicating device. This enhances the security of the data accessed in the memory of the communicating device.

Additionally or alternatively, said data read from said communicating device are protected by an access control. Here, the data are only made available to the terminal after predetermined authentication criteria are met (the user of the device enters a PIN on the terminal for example).

Additionally or alternatively, the data contained in the communicating device can be protected by an authentication process or by other security methods which will be apparent to those skilled in the art.

The invention also relates to a computer program comprising instructions for implementing the above method when the program is executed by an electronic data processing unit. Typically, the electronic data processing unit can be a processor, a microcontroller, or other means capable of processing computer data. An example of the main steps implemented by this computer program are represented in FIG. 2.

The invention also relates to a terminal for accessing a local service, comprising:

- a means for managing an access to the service;
- a module for reading/writing data contained in a communicating device;
- a data storage means adapted for storing at least a portion of the data read in the communicating device, the data read from the device being personal data concerning the communicating device and/or third-party service data;
- a controller adapted to control the writing in the communicating device of third-party data selected from among a set of third-party service data saved in said storage means, the selection of the third-party data to be written being based on selection criteria.

In addition, the controller can be designed to control the reading of third-party data in the communicating device. Typically, the read command is used to read all or part of the personal data of the communicating device or third-party service data it contains, or the personal data and third-party data together.

When reading data, the access terminal may update a database in its storage medium. However, if the read data are already in the terminal's database, the database is updated with the read data only if they are newer than the data already in it.

When writing data, the access terminal updates the data stored in a communicating device according to said selection criteria (data redundancy, criticality of data to be distributed, remaining memory, etc.).

Thus, the database of the terminals is updated with the read data, and the written data constitute data to be updated on other access terminals or in the central system. In this manner, the service data are relayed appropriately between the entities of the service so that the service is provided appropriately the basis of the data distributed by the communicating devices.

Preferably, the terminal is designed to establish at least one local communication with a communicating device. Local communication is understood to mean communication between the terminal and the device within a radius of a few meters. Typically, such communication can be implemented by:

- a local wireless connection according to the IEEE 802.11 standard (such as Wi-Fi), the IEEE 802.15.4 standard (such as ZigBee), infrared, Bluetooth, or other;
- near field communication according to a radio frequency identification (RFID) technology for example;
- or other.

Advantageously, said selection criteria are determined by the controller in relation to the data read from the communicating device.

Additionally or alternatively, these selection criteria are determined by the controller in relation to the read data saved in said storage means.

Additionally or alternatively, said third-party data read from the communicating device comprise instructions for the terminal to be executed by the controller. These instructions are advantageously contained in said transfer data. Thus, the data communicated or to be communicated by the devices can be:

- software update data for the terminals;
- service messages;

order data or data for specific services to be implemented by the terminals;

or some other data.

Advantageously, the access terminal may include means for data encryption/decryption provided for implementing said cryptographic technique for the data read/written according to the method. Such a technique could also verify the source of the data read/written and the integrity of these data in order to add further security to accessing the data contained in the communicating devices.

Additionally or alternatively, the terminal may include means for controlling access to said read data. This means of controlling access may be designed to authenticate a user (for example via a PIN) before authorizing access to said secure read data.

According to one embodiment of a connected terminal, the access terminal preferably comprises means of distance communication. In this embodiment, the communicating device and/or the central system may include a corresponding means of communication so that a long distance communication can be established with the access terminal Data on the communicating device can thus be read/written remotely by the terminal, such as updates done using the central system. Typically, said means of distance communication can be a communication module of a cellular network (adapted for the 3G standard for example).

In another possible embodiment, only the central system and the communicating devices include means of distance communication. In this manner, service data updates between the access terminals and the central system can be done remotely and directly via the communicating devices. It is understood that no connection (neither wired nor cellular network) is then required between the terminals and the central system, the data here being collected and distributed:

on access terminals when the terminal is accessed by communicating devices (data to be communicated is read/written), and on the central system via the means of distance communication (data to be distributed is sent/received).

As an illustration, service data are communicated by the communicating devices in a distribution that is invisible to the user (via an OTA (Over The Air) technology for example).

The invention further relates to a system for accessing a local service, comprising:

at least one information system (previously referred to as the central system) comprising service data;

at least one communicating device; and at least the aforementioned access terminal for accessing the service.

BRIEF DESCRIPTION OF THE DRAWINGS

Other features and advantages of the invention will be apparent on reading the following detailed description of some exemplary embodiments given by way of illustration and not limitation, and with reference to the accompanying drawings in which.

DETAILED DESCRIPTION

For reasons of clarity, the dimensions of the various elements represented in the figures are not necessarily in proportion to their actual sizes. Identical references correspond to identical elements in the figures.

Figure 1:
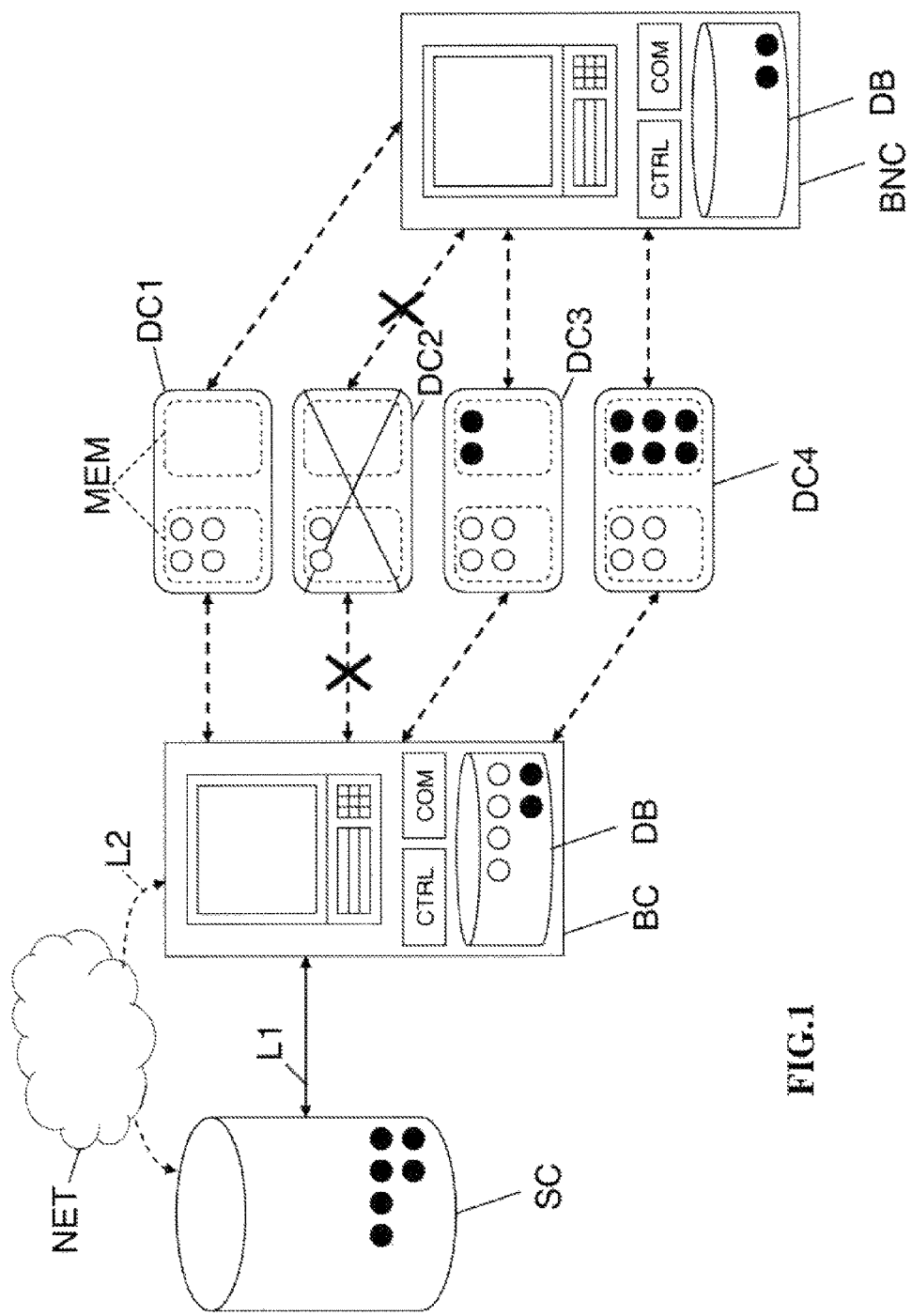
FIG. 1 illustrates the system for accessing a local service according to the invention.

We refer firstly to FIG. 1 which illustrates an example of a system for accessing a local service according to the invention and comprising:

the central system SC, which contains service data and in particular data for the local service in question;

access terminals for accessing the local service, of which at least one access terminal BC is connected to the central system SC and at least one access terminal BNC is unconnected;

communicating devices DC1 to DC4, each with a memory MEM provided for reading and/or writing by access terminals BC and BNC and thus containing personal data (represented by empty circles) of the communicating device and/or third-party service data (represented by solid circles).

For example, said local service may involve providing electricity at access terminals or renting a vehicle from these terminals. However, the local service may concern other services which will be apparent to those skilled in the art when considering the purpose of the invention.

The central system SC is typically a server-type remote information system. One particular role of the central system SC is to gather, manage, and distribute the data associated with the services and in this case the data related to the local service.

The access terminal BC is connected to the central system SC via a link L1 which may be physical, such as a wired broadband connection. Alternatively, the terminal BC is connected to the central server SC via a cellular communication link, as detailed below. Of course, it is understood that access terminal BNC is a terminal unconnected to the central system SC, and thus by definition it does not have a direct communication link with it.

The communicating devices represented for illustration purposes are such that:

communicating device DC1 only contains personal data relating to the communicating device;

communicating device DC2 does not have permission to access the local service;

communicating device DC3 contains personal data and transfer data to be communicated to an unconnected access terminal BNC; and communicating device DC4 contains personal data and third-party service data (including personal data of another device) to be distributed to other access terminals for passing on to the central system SC.

In one possible embodiment, the communicating device DC2 is read/written by the access terminal in order to retrieve/write data on the device, although without providing the service the device is not authorized to access. It is thus understood that devices other than those capable of being provided the service can also propagate data between different access terminals.

For the personal data described above, it is understood that these data relate directly to the communicating device (access rights, type of device administrator/user, memory size, etc.), a user account (remaining credit, subscribed services, etc.), or the user of the device (identity and contact information, reference for linked electricity meter, etc.).

Here, the communicating devices are represented as a card with memory MEM. This card is capable of establishing a local communication with the access terminals BC and BNC. In particular, this card can be a smart card. However, it is understood that this example is merely illustrative and not limiting, as the communicating devices can also be:
- mobile phones or digital tablets which have a near field communication module meeting the NFC standard;
- electronic devices with a Bluetooth communication module;
- laptop computers with Wi-Fi;
- or some other device.

Furthermore, the access terminals BC and BNC which are the points of entry for accessing the local service comprise:
- a means for managing access to the service (not represented in the figures);
- a module COM for reading/writing data on a communicating device;
- a data storage means DB suitable for storing at least a portion of the data read on the communicating device, the data read from the device being personal data relating to the communicating device and/or third-party service data;
- a controller CTRL suitable for controlling the writing on the communicating device of third-party data selected from among a set of third-party service data stored in said storage means, the selection of the third-party data to be written being based on selection criteria.

The module COM is adapted for reading/writing data locally on communicating devices seeking access to the local service. The term "locally" is understood to mean a read/write which can be achieved within a radius of a few meters, according to the limits of the communication technology used by the access terminals and communicating devices (NFC, Bluetooth, Wi-Fi, etc.).

The controller CTRL may constitute a means of implementing a cryptographic technique allowing encryption/decryption protecting the access to data stored in the memory MEM of the communicating devices.

In one embodiment, the access terminals BC contain a means of distance communication (not represented in the figures). The terminals can thus communicate remotely with the central system SC via a network NET and a mobile telephony cellular network connection L2. In this embodiment, a longer distance communication established directly between the terminals and communicating devices (which would have a means of long-range communication) can be considered.

The third-party service data do not directly concern the user of the communicating device. These data are preferably not accessible and/or are protected. The third-party service data may be, for example:
- personal data of at least one other communicating device;
- lists of communicating devices authorized or not authorized to access the local service;
- histories of terminal usage use by communicating devices;
- transfer data intended for access terminals; or data from various services, alternatively or in addition to the data delivered by the access terminals.

Thus, the user unknowingly receives and distributes third-party service data when using the local service with his communicating device.

In this case, when a user accesses a connected access terminal BC, some or all of the data in the memory MEM of the communicating device can be saved to the storage means DB of the terminal and communicated to the central system SC which integrates them with the data related to the local service and/or other associated services. In return, and as explained in reference to the next figures, data can be written based on selection criteria determined by the controller CTRL of the terminal. The written data can supplement, replace, or erase the data contained in the memory MEM of the communicating devices with data to be distributed to other terminals, particularly unconnected terminals.

When the user accesses an unconnected access terminal BNC, some or all of the data in the memory MEM of his device are also saved in the storage means DB of the terminal BNC. For this, it is advantageous to provide storage means DB of high capacity, at least for these terminals BNC that are not designed to retrieve data directly from the central system SC. Thus, to replace the direct connection, all data from devices accessing the service are stored so as to construct a service database locally. It is understood that the access terminals (particularly terminals BNC) can then act as a "buffer" or "repeater" to ensure more reliable dissemination, distribution, and redundancy of the data as explained below. Such terminals can be chosen based on the selection criteria determined when writing the data, then relaying the information to be distributed within the system. The data distribution phenomenon described above can be compared to a data "pollination" of the terminals by the communicating devices.

According to one embodiment, an administrator-type communicating device may include more memory MEM than a user-type communicating device. In this manner, the "administrator" communicating devices can contain more third-party service data, more third-party transfer data, or other data.

It is understood that through the data distribution and redundancy (detailed below) carried out by the terminals BC and BNC on the communicating devices, the loss or destruction of one of the communicating devices (for example device DC1) does not compromise the system since it is possible to recover the data it originally contained from other terminals it has already accessed or via its data written within the third-party data of other devices (for example device DC4).

Figure 2:
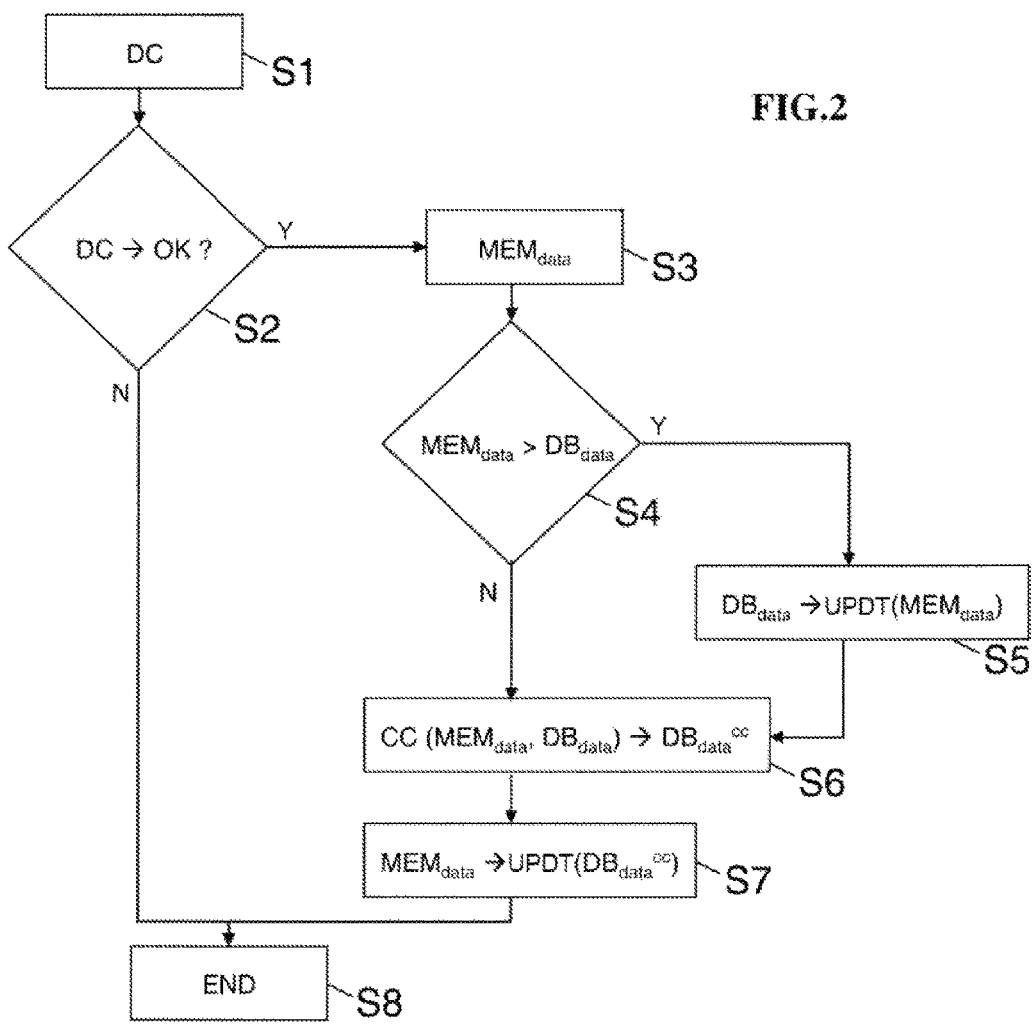
FIG. 2 is a flowchart of the method according to the invention.

We will now refer to FIG. 2 which shows the main steps of the method implemented by the access terminals BC and BNC.

In a first step S1, a communicating device DC approaches the access terminal with the intention of accessing the service. The communicating device DC is then detected by the module COM when it is sufficiently close to establish a local communication.

In a second step S2, the controller CTRL orders the module COM to read at least some of the data of the communicating device to determine whether the accessing device has the permissions and/or authorization to access the service and/or terminal Where appropriate, the data read by the module COM can be decrypted by the controller CTRL according to a cryptographic technique appropriate for the encryption performed by the terminals when writing data to the devices.

When the accessing communicating device has no access permissions or authorization (arrow N exiting the test in step S2), communication with the communicating device is ended by the terminal (in step S8), as the service is therefore not provided.

When the communicating device has the access permissions and/or authorization (arrow Y exiting the test in step S2), the controller CTRL orders the module COM in step S3 to read all the data $MEM_{data}$ contained in the memory MEM of the communicating device DC, said data including the personal data of the accessing communicating device and/or third-party service data.

In step S4, the data $MEM_{data}$ are compared with the data $DB_{data}$, the latter being stored in the storage means DB of the terminal. The $DB_{data}$ can be data read from communicating devices that have previously accessed the terminal or data originating from the central system if the terminal is connected.

When the comparison of the data $MEM_{data}$ and $DB_{data}$ determines that data $MEM_{data}$ are more recent than data $DB_{data}$ (arrow Y exiting the test in step S4), then the controller orders in step S5 that the data $DB_{data}$ be updated with the most recently read data $MEM_{data}$, via an update function UPDT for example.

When the data $MEM_{data}$ are not more recent (arrow N exiting the test in step S4), the access terminal directly implements step S6. In step S6, the controller CTRL of the terminal chooses data $DB_{data}^{cc}$ according to the selection criteria, denoted here as CC, from among the read data $MEM_{data}$ and the data $DB_{data}$. The selection criteria CC determined by the controller CTRL are defined in relation to:
- the read data $MEM_{data}$ from the accessing communicating device, the storage means DB having possibly been updated with said read data;
- the read data from communicating devices that have previously accessed the access terminal, being data $DB_{data}$ already stored in the DB.

As stated above, the selection criteria may be an information dissemination priority, a data distribution or redundancy to be achieved, the memory capacity of the communicating device, or some other selection criteria.

In a next step S7, the controller CTRL orders the module COM to write onto the accessing communicating device DC the selected data $DB_{data}^{cc}$. The data written by the module COM are then used to update data $MEM_{data}$ stored in the memory MEM of the device DC, according to an equivalent update function UPDT. The data written by the module COM may be encrypted by the controller CTRL at this stage.

After step S7, the terminal can end communications with the communicating device DC in step S8 and deliver or provide the service requested by the user.

The selected data $DB_{data}^{cc}$ written to the device DC will be communicated by the communicating device DC itself to other access terminals subsequently accessed by the user of the device. The data $DB_{data}^{cc}$ could also reach the central system SC if one of the terminals accessed by the user is a connected access terminal BC.

However, the flowchart in FIG. 2 is in no way limiting, and the steps can be implemented in a different sequence. For example, step S2 of determining the access permissions of the device DC may occur after steps S3 to S7. In such an example, it is then understood that the data of a device having no access rights for the service (such as the abovementioned device DC2) can still be read/written by the terminals so that the service data is propagated.

We will now refer to FIGS. 3-10, illustrating an exemplary implementation of the method on the terminals of the access system.

Figure 3A:
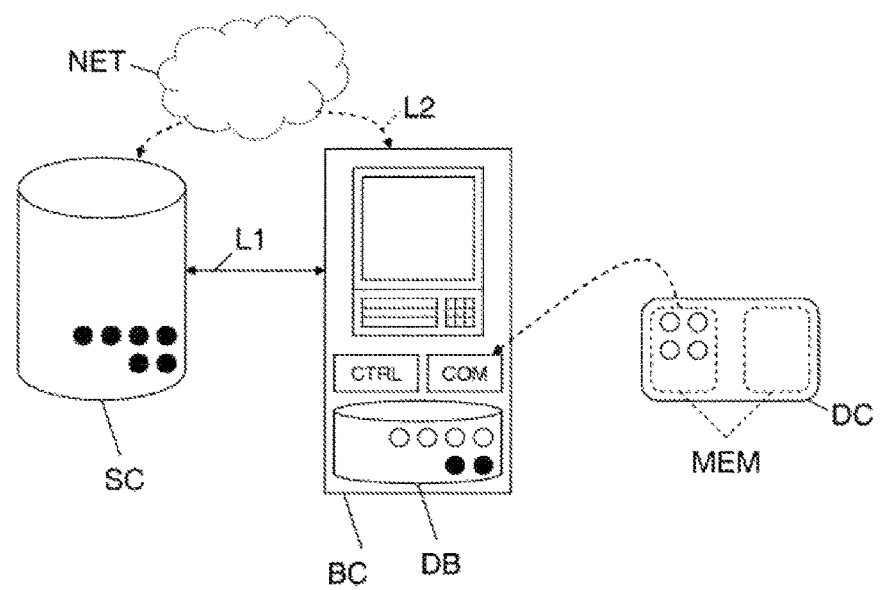
FIGS. 3a and 3b illustrate an example of a communicating device accessing the local service via a connected terminal.

In the particular case in FIG. 3a, a user presents his communicating device DC in order to access the local service at the connected terminal BC. Analogously to steps S1 and S2, the device DC is detected by the module COM of the terminal BC, then the controller CTRL orders that at least a part of the data contained in the memory MEM of the device DC is read. Here, the personal data (open circles in MEM) actually include the authorization to access the service. In addition, the personal data of the device DC are already contained in the storage means DB of the terminal BC (the user having previously accessed this terminal at least once for example). The personal data have therefore already been passed on, via link L1 or L2, to the central system SC which has stored them internally as third-party data linked to the local service.

However, if the personal data contained in the memory MEM of the device DC are more recent than the corresponding data on the storage means DB (arrow Y exiting the aforementioned step S4), then the corresponding data in the DB are updated with the data read from MEM (according to step S5). Next, the data updated in the DB will be sent on to the central system SC by the terminal BC.

Figure 3B:
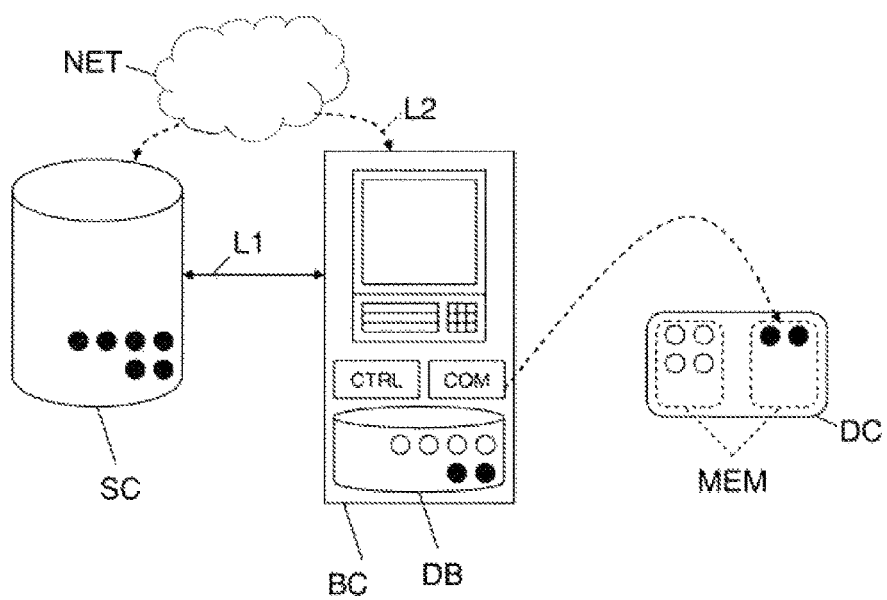

Referring now to FIG. 3b, the controller CTRL orders that third-party transfer data be written, these data being intended for other terminals (for example for a software update). Thus, the transfer data contained in the DB of the terminal BC are written by the module COM to the MEM of the device DC.

Figure 4A:
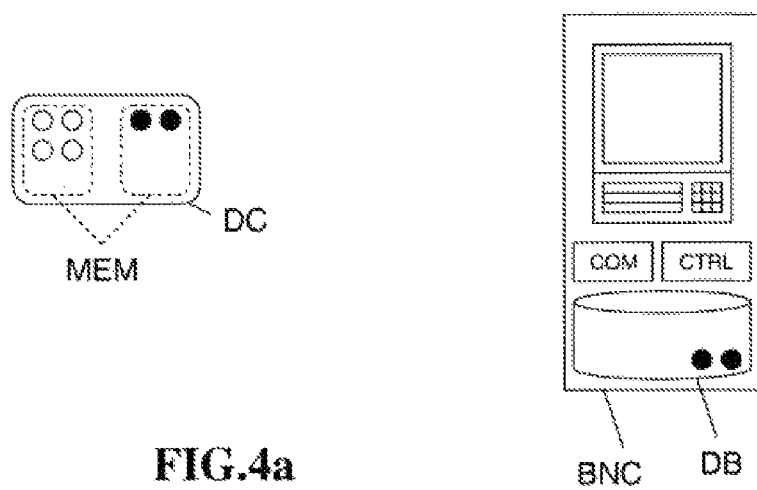
FIGS. 4a, 4b and 4c illustrate an example of the communicating device accessing the local service via an unconnected terminal.

After having accessed the local service at the access terminal BC, the user accesses an unconnected access terminal BNC as shown in FIG. 4a. This access terminal contains personal data of a user who had previously accessed this terminal.

Figure 4B:
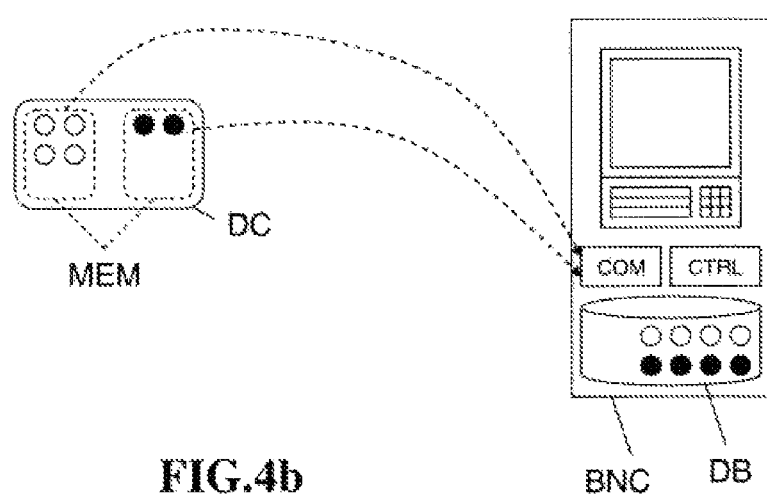
Figure 4C:
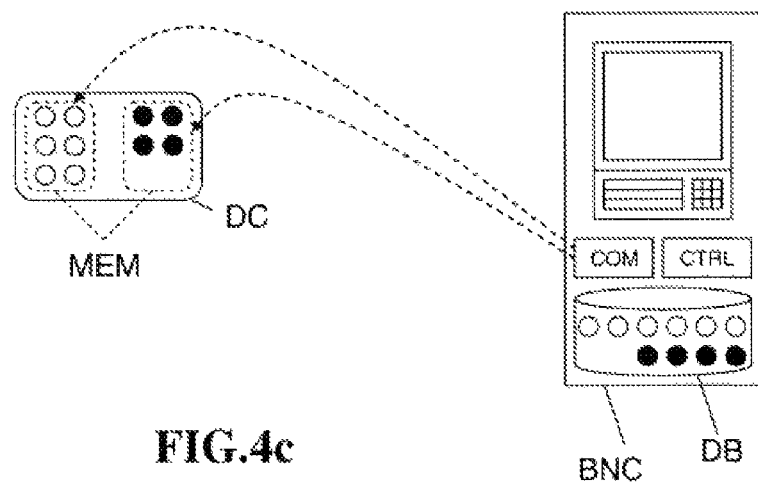

After detection of the device DC by the module COM of the terminal BNC, we now refer to FIG. 4b in which the controller CTRL of the terminal BNC orders the reading of data from the accessing device DC. For this example, it is understood that the terminal BNC retrieves the software update transfer data intended for it. The controller CTRL is able to implement the instructions relating to the transfer data and actually update the terminal.

Next, in one possible example, the data from the previous user need to be forwarded quickly to the central system SC. Thus, according to the aforementioned steps S6 and S7 and in reference to FIG. 4c, the controller CTRL orders the writing of selected third-party data (in this case the personal data of the previous user) to the device DC. In addition, the user of the device DC subscribes on the terminal BNC to a new local service. The controller CTRL of the terminal BNC then also orders the writing, via the module COM, of personal data relating to the new subscription (represented in the figure by two additional open circles).

Figure 5A:
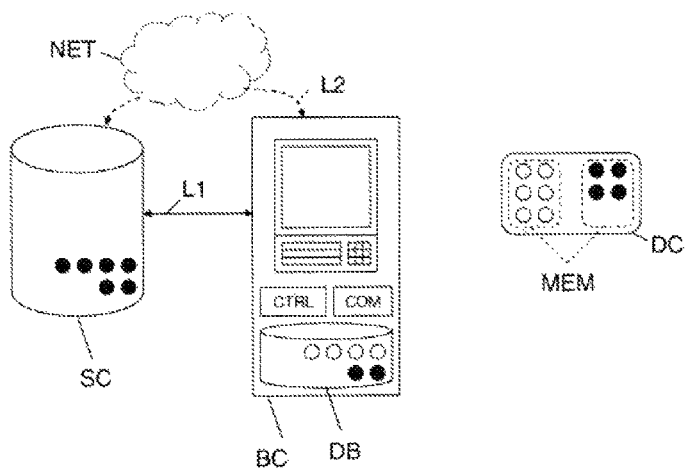
FIGS. 5a, 5b and 5c illustrate an example of the communicating device accessing the local service via the connected terminal, after accessing an unconnected terminal.
Figure 5B:
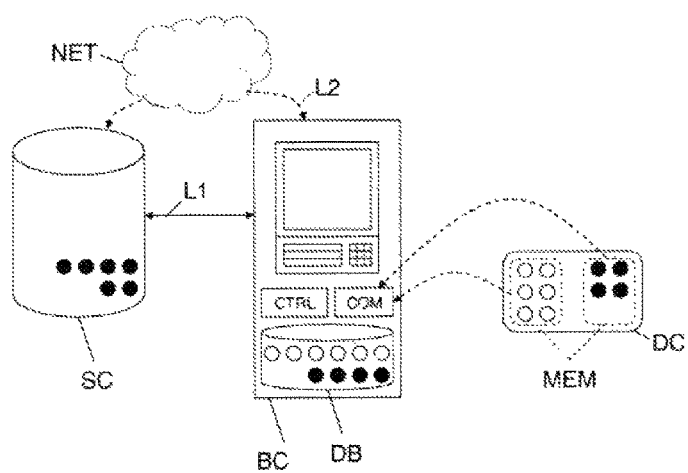
Figure 5C:
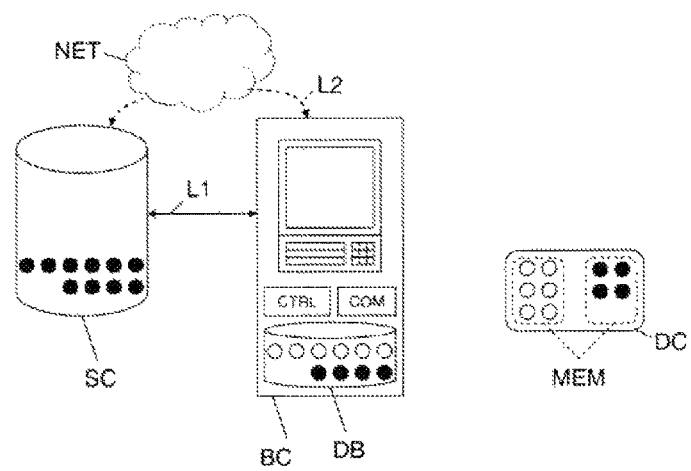

We now refer to FIG. 5a, where the user of the communicating device DC once again requests access to the local service from a connected terminal BC. In FIG. 5b, the module COM reads on the device DC new data related to said subscription and to the third-party data concerning the prior user on terminal BNC. These read data are saved by the controller CTRL to the storage means DB of the terminal BC. Thus, as represented in FIG. 5c, the connected terminal BC can send the new data read from the device DC on to the central system SC, which stores them as new data associated with said local service.

In a preferred embodiment, the third-party data written by the terminal according to the selection criteria may be only a portion of the data needed (pieces of data) to reconstruct the complete instruction or information item when read. Thus, even if a malicious attack successfully accesses the third-party data on a device, the stored pieces of third-party data do not allow a complete reconstruction of the instruction or information item. To achieve this, the determined selection criteria are aimed at distributing the various component pieces of data, of the instruction/information item to be disseminated, across different devices accessing the terminals. A same piece of data may be written to multiple accessing communicating devices, possibly but not necessarily consecutive, to ensure redundancy of the piece of data.

Figure 6:
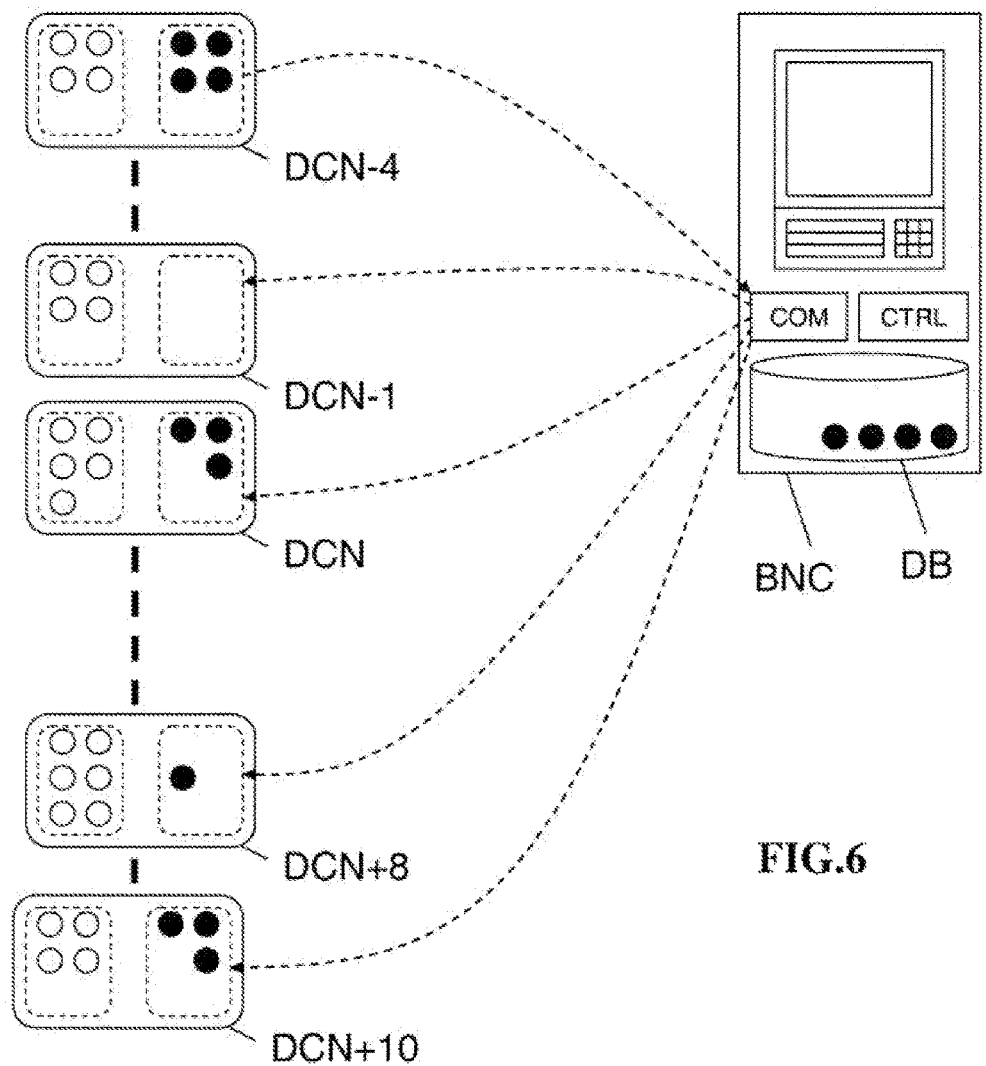
FIG. 6 shows the distribution and redundancy of third-party data written by the terminals on the communicating devices.

We now refer to FIG. 6, which illustrates an example of data distribution and redundancy. It is understood that the N-related sequence is relative to the order in which devices reach the unconnected terminal BNC. Here, the third-party data are read from device DCN−4. The third-party data read in this case are an information item to be distributed to a particular access terminal. The terminal BNC therefore stores these third-party data in its storage means DB. The selection criterion then determined by the controller of the terminal BNC is intended to write the third-party data originating from DCN−4 to devices that habitually access that particular access terminal Thus, when device DCN−1 has never accessed this particular terminal according to its personal data, the terminal BNC does not write to DCN−1 said third-party data to be distributed. However, device DCN is habitually used to access the local service at that terminal and the data in question should be distributed to it. The controller CTRL therefore orders that a first piece of data among the third-party data originating from DCN−4 be written to it. When device DCN+8 accesses BNC, said device having the same habits as DCN, then the controller CTRL orders that a second piece of data be written to DCN+8. For redundancy, the controller CTRL can order that the first piece of data be written to a subsequently accessing device DCN+10.

Of course, the invention has been described according to a few embodiments but can be applied to other embodiments which will be apparent to those skilled in the art. For example, the validity of the access rights of a communicating device could be temporary (valid for only a few weeks, for example), so that the user is forced to connect regularly to a connected terminal and update the service data with service data coming directly from the central system.

The invention claimed is:

1. A method of accessing a local service, comprising the steps of:
a plurality of communicating devices accessing the local service via a first access terminal of said local service;
wherein, for each of the plurality of communicating devices:
the first access terminal reads data from the communicating device, the data being personal data relating to the communicating device and/or third-party service data;
the first access terminal writes one or more pieces of data to the communicating device, the one or more pieces of data written being selected from among a set of third-party service data, the selection of third-party data to be written by the first access terminal being based on selection criteria, wherein said one or more pieces of data belong to a set of pieces of data comprising a plurality of pieces of data, said plurality of pieces of data of said set constituting together an information item or an instruction, said one or more pieces of data written to the communicating device forming only part of said set of pieces of data; and
the communicating devices each accessing the local service via one or more second access terminals, wherein for each communicating device the corresponding second access terminal retrieves the one or more pieces of data written to the communicating devices by the first access terminal;
wherein all the pieces of data of said set of pieces of data are distributed among the plurality of communicating devices so as to allow the retrieval of the information item or instruction corresponding to said set of pieces of data; and
wherein the pieces of data are distributed in a pseudo-random distribution between the communicating devices, whereby said plurality of communicating devices forms a pseudo-random selection of communicating devices.

2. The method according to claim 1, wherein said selection criteria are defined by the access terminal in relation to the data read from the communicating device.

3. The method according to claim 1, wherein said one or more pieces of data from one of the communicating devices comprise personal data from at least one other of the communicating devices.

4. The method according to claim 1, wherein said one or more pieces of data comprise transfer data intended for the second access terminal.

5. The method according to claim 1, wherein said one or more pieces of data written by the first access terminal are encrypted, and the one or more pieces of data retrieved from the communicating device are decrypted by the one or more second access terminals.

6. The method according to claim 1, wherein said data read from said communicating devices are protected by an access control.

7. The method according to claim 1, wherein said personal data of each communicating device comprise information relating to a user account of the local service.

8. A non-transitory computer program product comprising instructions for implementing the method according to claim 1 when the program is executed by an electronic data processing unit.

9. An access terminal for accessing a local service, comprising:
means for managing an access to the local service;
a module for reading/writing data contained in each of a plurality of communicating devices;
data storage means adapted for storing at least a portion of the data read in the communicating devices, the data read from each communicating device being personal data relating to the communicating device and/or third-party service data;
a controller adapted to control, for each of said plurality of communicating devices, the writing in the communicating device of one or more pieces of data selected from among a set of third-party service data, the selection of the third-party data to be written by the first access terminal being based on selection criteria, wherein said one or more pieces of data belong to a set of pieces of data comprising a plurality of pieces of data, said set of pieces of data constituting together an information item or an instruction, said one or more pieces of data written to each communicating device forming only part of said set of pieces of data, wherein the controller is further adapted to distribute all the pieces of data of said set of pieces of data among the plurality of communicating devices, so as to allow the retrieval of the information item or instruction corresponding to said set of pieces of data upon connection of the communicating devices to the local service via one or more second access terminals, wherein the pieces of data are distributed in a pseudo-random distribution between the communicating devices, whereby said plurality of communicating devices forms a pseudo-random selection of communicating devices.

10. The terminal according to claim 9, wherein said selection criteria are determined by the controller in relation to the data read from the communicating devices.

11. The terminal according to claim 9, wherein said selection criteria are determined by the controller in relation to the read data saved in said storage means.

12. The terminal according to claim 9, wherein said third-party data read from the communicating devices comprise instructions for the terminal to be executed by the controller.

13. The terminal according to claim 9, comprising means for data encryption/decryption.

14. The terminal according to claim 9, comprising a means for controlling access to said read data.

15. The terminal according to claim 9, comprising means for distance communication.

16. A system for accessing a local service, comprising:
at least one information system comprising service data;
a plurality of communicating devices; and
at least one access terminal for accessing the service according to claim 9, and
one or more second access terminals to which the communicating devices are configured to connect to access the local service so as to allow the retrieval of all the pieces of data of the set of pieces of data for the reconstitution of the information item or instruction corresponding to said set of pieces of data.

* * * * *